US007001867B2

(12) United States Patent
Jin et al.

(10) Patent No.: US 7,001,867 B2
(45) Date of Patent: Feb. 21, 2006

(54) RARE EARTH ALUMINATES AND GALLATES SUPPORTED RHODIUM CATALYSTS FOR CATALYTIC PARTIAL OXIDATION OF HYDROCARBONS

(75) Inventors: Yaming Jin, Ponca City, OK (US); Tianyan Niu, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 362 days.

(21) Appl. No.: 10/152,278

(22) Filed: May 21, 2002

(65) Prior Publication Data
US 2004/0221508 A1    Nov. 11, 2004

(51) Int. Cl.
| | | |
|---|---|---|
| B01J 23/00 | (2006.01) | |
| B01J 8/00 | (2006.01) | |
| C01B 31/18 | (2006.01) | |
| C01B 6/54 | (2006.01) | |
| C07C 27/00 | (2006.01) | |

(52) U.S. Cl. ............... 502/302; 502/303; 502/304; 502/325; 502/525; 423/246; 423/247; 423/248; 423/651; 423/418.12; 252/373; 518/701; 518/716

(58) Field of Classification Search ........ 502/302–304, 502/325, 525; 423/246–248, 651, 418.12; 252/373; 518/701, 716
See application file for complete search history.

(56) References Cited

U.S. PATENT DOCUMENTS

| | | | | |
|---|---|---|---|---|
| 3,752,775 | A | | 8/1973 | Yamaguchi et al. ......... 252/464 |
| 4,140,655 | A | * | 2/1979 | Chabot et al. .............. 502/303 |
| 4,151,123 | A | | 4/1979 | McCann, III ............... 252/462 |
| 4,511,673 | A | * | 4/1985 | Eto ............................. 502/302 |
| 4,537,873 | A | | 8/1985 | Kato et al. .................. 502/242 |
| 4,585,752 | A | | 4/1986 | Ernest ........................ 502/314 |
| 4,738,946 | A | * | 4/1988 | Yamashita et al. ......... 502/303 |
| 4,793,797 | A | | 12/1988 | Kato et al. ..................... 143/7 |
| 4,961,786 | A | | 10/1990 | Novinson ................... 106/692 |
| 5,736,482 | A | | 4/1998 | Durand et al. ............. 502/303 |
| 5,837,634 | A | | 11/1998 | McLaughlin et al. ....... 501/127 |
| 6,015,285 | A | * | 1/2000 | McCarty et al. .............. 431/7 |
| 6,303,098 | B1 | * | 10/2001 | Kramarz et al. ........... 423/656 |
| 6,348,278 | B1 | * | 2/2002 | LaPierre et al. ............. 429/17 |
| 6,399,528 | B1 | | 6/2002 | Krell et al. ................... 501/80 |

(Continued)

OTHER PUBLICATIONS

PCT International Search Report for Appln. No. PCT/US03/36051, dated May 4, 2004; (3 p.).
Amato et al., *Sintering of Pelleted Catalysts for Automotive Emission Control*, pp. 187-197, no month/year.

(Continued)

Primary Examiner—Karl Group
Assistant Examiner—Patricia L. Hailey
(74) Attorney, Agent, or Firm—Conley Rose P.C.

(57) ABSTRACT

The present invention relates to improved catalyst compositions, as well as methods of making and using such compositions. In particular, preferred embodiments of the present invention comprise rare earth catalyst supports, catalyst compositions having rare earth supports, and methods of preparing and using the catalysts and supports. Accordingly, the present invention also encompasses an improved method for converting a hydrocarbon containing gas and an oxygen containing gas to a gas mixture comprising hydrogen and carbon monoxide, i.e., syngas, using the rare earth catalyst supports in accordance with the present invention. In addition, the present invention contemplates an improved method for converting hydrocarbon gas to liquid hydrocarbons using the novel syngas catalyst supports and compositions described herein.

29 Claims, 1 Drawing Sheet

U.S. PATENT DOCUMENTS

| | | | |
|---|---|---|---|
| 6,447,745 B1 | 9/2002 | Feeley et al. | 423/648.1 |
| 6,455,597 B1 | 9/2002 | Hohn et al. | 518/715 |
| 6,465,530 B1 * | 10/2002 | Roy-Auberger et al. | 518/715 |
| 2003/0032554 A1 | 2/2003 | Park et al. | 502/302 |
| 2003/0045423 A1 * | 3/2003 | Dindi et al. | 502/302 |
| 2004/0058810 A1 * | 3/2004 | Baumann et al. | 502/304 |
| 2004/0138060 A1 * | 7/2004 | Rapier et al. | 502/302 |
| 2004/0138317 A1 * | 7/2004 | Xie et al. | 518/703 |
| 2004/0142815 A1 * | 7/2004 | Ramani et al. | 502/325 |

OTHER PUBLICATIONS

Arai et al., *Recent Progress in High-Temperature Catalytic Combustion*, Catalysis Today, 10 (1991) pp. 81-94, no month.

Arai et al., *Thermal Stabilization of Catalyst Supports and their Application to High-Temperature Catalytic Combustion*, Applied Catalysis A: General 138 (1996) pp. 161-176, no month.

Artizzu-Duart et al, *Catalytic Combustion of Methane on Substituted Barium Hexaaluminates*, Catalysis Today 59 (2000) pp. 163-177, no month.

Beguin et al., *Stabilization of Alumina by Addition of Lanthanum*, Applied Catalysis 75 (1991) pp. 119-132, no month.

Bish et al., *Quantitative Phase Analysis Using the Rietveld Method*, J. Appl. Cryst. (1998) 21, pp. 86-91, no month.

Cai et al., *Atomic Scale Mechanism of the Transformation of y-Alumina to O-Alumina*, Physical Review Letters, vol. 89, No. 23, (Dec. 2, 2002) pp. 235501-1-235501-4.

Chen et al., *High Temperature Thermal Stabilization of Alumina Modified by Lanthanum Species*, Applied Catalysis A: General 205 (2001) pp. 159-172, no month.

Dexpert-Ghys, *Optical and Structural Investigation of the Lanthanum β-Alumina Phase Doped with Europium*, Journal of Solid State Chemistry 19, (1976) pp. 193-204, no month.

Farrington et al., *The Lanthanide β Alumina*, Applied Physics A 32 (1983) pp. 159-161, no month.

Groppi et al., *Preparation and Characterization of Hexaaluminate-Based Materials for Catalytic Combustion*, Applied Catalysis A: General, 104 (1993) pp. 101-108, no month.

Jang et al., *Catalytic Oxidation of Methane Over Hexaaluminates and Hexaaluminate-Supported Pd Catalysts*, Catalysis Today 47 (1999) pp. 103-113, no month.

Johansson et al., *Development of Hexaaluminate Catalysts for Combustion of Gasified Biomass in Gas Turbines*, Journal of Engineering for Gas Turbines and Power, vol. 124 (Apr. 2002) pp. 235-238.

Kato et al., *Preparation of Lanthanum β-Alumina with High Surface Area by Coprecipitation*, Journal of the American Ceramic Society, 70 [7] (Jul. 1987) pp. C-157-159.

Levy et al., *The Effect of Foreign Ions on the Stability of Activated Alumina*, Journal of Catalysis 9 (1967) pp. 76-86, no month.

Liu et al., *Partial Oxidation of Methane over Nickel Catalysts Supported on Various Aluminas*, Korean Journal of Chemical Engineering 19 (5) pp. 735-741 (2002), no month.

Liu et al., *Partial Oxidation of Methane over Ni/Ce-ZrO/0-$Al_2O_3$* Korean Journal of Chemical Engineering 19(5) pp. 742-748 (2002), no month.

Machida et al., *Effect of Additives on the Surface Area of Oxide Supports for Catalytic Combustion*, Journal of Catalysts 103 (1987) pp. 385-393, no month.

Machida et al., *Analytical Electron Microscope Analysis of the Formation of $BaO-6Al_2O_3$* Journal of American Ceramic Society 71[12] pp. 1142-1147 (1988), no month.

Machida et al., *Effect of Structural Modification on the Catalytic Property of Mn-Substituted Hexaaluminates*, Journal of Catalysis 123 (1990) p. 477-785, no month.

Matsuda et al., *8th International Congress on Catalysis vol. IV: Impact of Surface Science on Catalysis Structure-Selectivity/Activity Correlations New Routes for Catalyst Synthesis (pp. IV-879-889)*, no month/year.

Miao et al., *Partial Oxidation of Methane to Syngas over Nickel-Based Catalysts Modified by Alkali Metal Oxide and Rare Earth Metal Oxide*, Applied Catalysts A: General 154 (1997) pp. 17-27, no month.

Nair et al., *Pore Structure Evolution of Lanthana-Alumina Systems Prepared through Coprecipitation*, Journal of American Ceramic Society 83[8] (2000) pp. 1942-1946, no month.

Oudet et al., *Thermal Stabilization of Transition Alumina by Structural Coherence with $LnAlO_3$(Ln=La, Pr, Nd)*, Journal of Catalysis 114, (1998) pp. 112-120, no month.

Rahkeev et al., *Transition Metal Atoms on Different Alumina Phases: The Role of Subsurfaces Sites on Catalytic Activity*, Physical Review B 67, 115414 (2003) p. 4, no month.

Rietveld, *A Profile Refinement Method for Nuclear and Magnetic Structures*, Journal of Appl. Cryst. (1969) 2, pp. 65-71, no month.

Roh et al., *Partial Oxidation of Methane over Ni/O-$Al_2O_3$ Catalysts*, Chemistry Letters 2001 (pp. 666-667), no month.

Santos et al., *Standard Transition Aluminas, Electron Microscopy Studies*, Materials Research, vol. 3 No. 4 (2000) pp. 104-114, no month.

Schaper et al., *The Influence of Lanthanum Oxide on the Thermal Stability of Gamma Alumina Catalyst Supports*, Applied Catalysis 7 (1983) pp. 211-220, no month.

Schaper et al., *Thermal Stabilization of High Surface Area Alumina*, Solid State Ionics 16 (1985) pp. 261-266, no month.

Seo et al., *Experimental and Numerical Studies on Combustion Characteristics of a Catalytically Stabilized Combustor*, Catalysis Today 59 (2000) pp. 75-86, no month.

Russell et al., *Thermal Transformations of Aluminas and Alumina Hydrates*, Industrial and Engineering Chemistry vol. 42, No. 7 (1950) pp. 1398-1403, no month.

Subramanian et al., *Characterization of Lanthana/Alumina Composite Oxides*, Journal of Molecular Catalysts, 69 (1991) pp. 235-245, no month.

Taylor, *Computer Programs for Standardless Quantitative Analysis of Minerals Using the Full Powder Diffraction Profile*, Powder Diffraction, vol. 6, No. 1 (1991) pp. 2-9, no month.

Tietz et al., *Investigations on Lanthanide-ion-exchanged βand β-Alumina*, Journal of Alloys and Compounds, 192 (1993) pp. 78-80, no month.

Tijburg et al., *Application of Lanthanum to Psuedo-Boehmite and y-$Al_2O_3$*, Chapman and Hall (1991) pp. 6479-6486, no month.

Weng et al., *Mechanistic Study of Partial Oxidation of Methane to Syngas Using In Situ Time-Resolved FTIR and Microprobe Raman Spectroscopies*, The Chemical Record vol. 2, pp. 102-113 (2002), no month.

Wu et al., *Coupled Thermodynamic-Phase Diagram Assessment of the Rare Earth Oxide-Aluminium Oxide Binary System*, Journal of Alloys and Compounds, 179 (1992) pp. 259-287, no month.

Zhou et al., *Structures and Transformation Mechanisms of the n, y and 0 Transition Aluminas*, International Union of Crystallography (1991) pp. 617-630, no month.

* cited by examiner

RARE EARTH ALUMINATES AND GALLATES SUPPORTED RHODIUM CATALYSTS FOR CATALYTIC PARTIAL OXIDATION OF HYDROCARBONS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention generally relates to catalysts and processes for the catalytic conversion of hydrocarbons (e.g., natural gas) using rare earth based catalysts to produce carbon monoxide and hydrogen (synthesis gas). More particularly, the invention relates to such catalysts and their manner of making, and to processes employing the catalysts for production of synthesis gas.

BACKGROUND OF THE INVENTION

Catalysis is the basis for many industrial/commercial processes in the world today. The most important aspect of a catalyst is that it can increase the productivity, efficiency and profitability of the overall process by enhancing the speed, activity and/or selectivity of a given reaction. Many industrial/commercial processes involve reactions that are simply too slow and/or efficient to be economical without a catalyst present. For example, the process of converting natural gas or methane to liquid hydrocarbons (an extremely desirable process) necessarily involves several catalytic reactions.

The conversion of methane to hydrocarbons is typically carried out in two steps. In the first step, methane is catalytically reformed with water to produce carbon monoxide and hydrogen (i.e., "synthesis gas" or "syngas"). In a second step, the syngas intermediate is catalytically converted to higher hydrocarbon products by processes such as the Fischer-Tropsch Synthesis. For example, fuels with boiling points in the middle distillate range, such as kerosene and diesel fuel, and hydrocarbon waxes may be produced from the synthesis gas.

Current industrial use of methane as a chemical feedstock proceeds by the initial conversion of methane to carbon monoxide and hydrogen by either steam reforming or dry reforming. Steam reforming currently is the major process used commercially for the conversion of methane to synthesis gas, the reaction proceeding according to Equation 1.

$$CH_4 + H_2O \rightleftharpoons CO + 3H_2 \quad (1)$$

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial or direct oxidation of methane yields a syngas mixture with a more preferable $H_2$:CO ratio of 2:1, as shown in Equation 2:

$$CH_4 + 1/2 O_2 \rightleftharpoons CO + 2H_2 \quad (2)$$

The $H_2$:CO ratio for this reaction is more useful for the downstream conversion of syngas to chemicals such as methanol or other fuels than is the $H_2$:CO ratio from steam reforming. However, both reactions continue to be the focus of research in the world today.

As stated above, these reactions are catalytic reactions and the literature is replete with varying catalyst compositions. The more preferred catalytic metals are Group VIII or noble metals. These metals are sometimes combined with secondary metals to enhance their activity. Further, the catalyst compositions include particular support materials such as alumina, silica, titania, and the like.

After a period of time in operation, a catalyst will become deactivated, losing its effectiveness for enhancing the desired reaction to a degree that makes it uneconomical at best and inoperative at worst. This process is generally known as "aging." The more aged a particular catalyst the less efficient the catalyst is at enhancing the reaction, i.e., less activity it has. At this point, the catalyst can be either replaced or regenerated. However, replacing a catalyst typically means discarding the deactivated catalyst. A discarded catalyst represents a loss of expensive metals. Alternatively, the user may send the catalyst back to the supplier for recovery of expensive metals, such as Rh, Pt, Pd, etc. However, the recovery process involves dissolving the multi-component catalyst and subsequent separation of the active components from the mixed solution. The chemistry is complex and costly, more importantly, it involves bulk amounts of harsh chemicals that ultimately must be discarded and the use of landfills for such disposal is problematic. For all of these reasons, regeneration is preferred over replacement. Regeneration generally refers to any process used to restore all or some of the original activity to the deactivated catalyst.

Catalysts systems can become deactivated by a number of processes, including coking, sintering, poisoning, oxidation, and reduction. Most of these processes are reversible, although not economically feasible. The most common deactivation mechanism is coking or fouling of the catalyst. Simply put, coking is the formation of hydrocarbonaceous residue on the surface of the catalyst. As the coke forms, it physically blocks the reactants from reaching active sites. Over time the coke will completely engulf or cover the active sites preventing the catalytic reaction from taking place. Further, the coke results in an increase in pressure drop across the catalyst bed due to the buildup of carbon in the flow paths or interstices.

Another deactivation mechanism is sintering. Sintering is particularly difficult to regenerate and has traditionally been viewed as a non-reversible phenomenon. Sintering is the process in which fine particles of a material become chemically bonded together without melting to form a mass. In the case of syngas catalysts, the fine particles of catalytic metal agglomerate together to form a large mass of catalytic metal effectively causing a decrease in the activity due to the decrease in surface area.

Because regeneration has traditionally been so difficult, the catalytic metals are typically dissolved and recaptured for use in new catalyst batches. However, research is continuing on the development of more efficient syngas catalyst systems and catalyst systems that can be more effectively regenerated. At the present time, there are no known methods that are economically feasible for regenerating a sintered syngas catalyst.

Hence, there is still a great need to identify new partial oxidation catalysts, particularly partial oxidation catalysts that are less susceptible to deactivation.

SUMMARY OF THE INVENTION

The present invention is directed towards improved catalyst compositions, as well as methods of making and using such compositions. In particular, preferred embodiments of the present invention comprise rare earth catalyst supports, catalyst compositions having rare earth supports, and methods of preparing and using the catalysts and supports. Accordingly, the present invention also encompasses an improved method for converting an hydrocarbon containing gas and an oxygen containing gas to a gas mixture comprising hydrogen and carbon monoxide, i.e., syngas, using the rare earth catalyst supports in accordance with the present invention. In addition, the present invention contemplates an improved method for converting hydrocarbon gas to liquid hydrocarbons using the novel syngas catalyst supports and compositions described herein.

One of the preferred embodiments of the present invention is a novel partial oxidation catalyst support material that comprises a rare earth element. The preferred reaction is partial oxidation of methane, but the support is equally useful in oxidative dehydrogenation reactions. The preferred rare earth elements are Sm, La, Nd, Gd, Ce, Pr, Yb and mixtures thereof, and most preferably samarium and/or lanthanum. In addition, the rare earth element preferably comprises a rare earth aluminate, gallate, mixtures thereof or any equivalents thereof. The support material may be primarily the rare earth aluminate, gallate, mixture or equivalent or the support material may be a matrix of the rare earth aluminate, gallate, mixture or equivalent with a traditional support material, such as alumina, titania, zirconia, and the like, preferably alumina and zirconia.

Another of the preferred embodiments comprises a partial oxidation catalyst composition having a catalytic metal useful for catalyzing a partial oxidation reaction, e.g., for syngas production, and a support material in accordance with present invention and above description. The preferred catalytic metals are Group VIII or noble metals, most preferably rhodium.

Another embodiment of the present invention comprises methods of using the rare earth catalyst supports and/or compositions described above to produce a synthesis gas. The process comprises passing a hydrocarbon containing gas and an oxygen containing gas over a partial oxidation catalyst containing the rare earth support or composition described above under conditions effective to produce a gas stream comprising hydrogen and carbon monoxide.

The present invention also comprises a hydrocarbon gas to liquid conversion process. At least a portion of the synthesis gas stream produced as described above is reacted with a hydrocarbon synthesis catalyst in a hydrocarbon synthesis reactor under conditions effective to produce liquid hydrocarbons. In a preferred embodiment, the gas to liquid conversion process is carried out as a Fischer-Tropsch reaction in a Fischer-Tropsch reactor.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
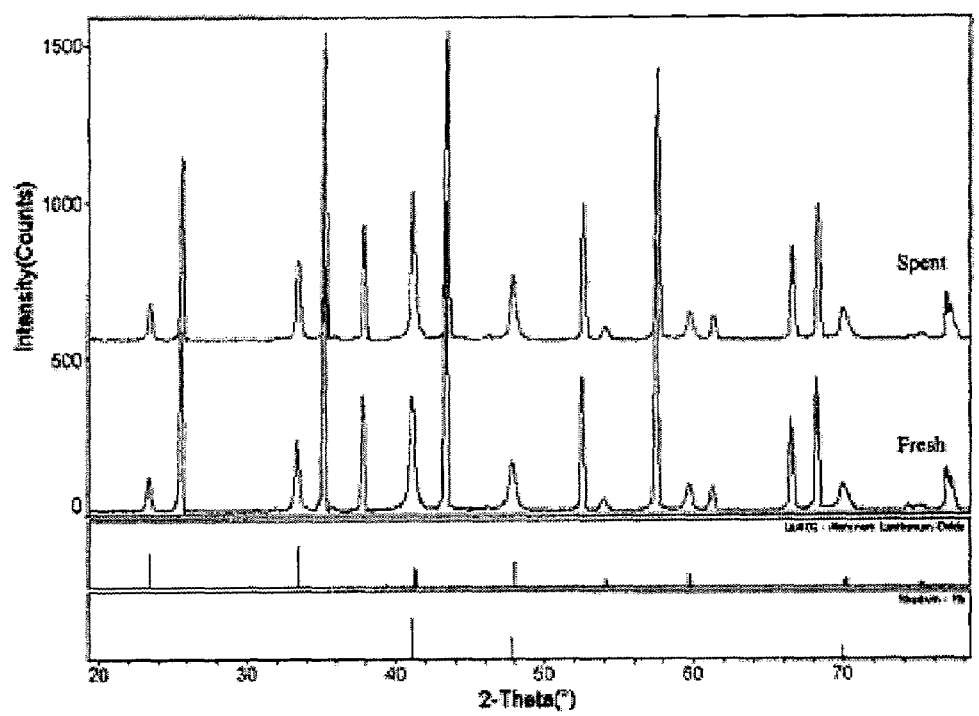
FIG. 1 is a comparison of XRD powder patterns of a Sm modified Rh catalyst before and after use in a partial oxidation reaction in accordance with a preferred embodiment of the present invention.

There are shown in the Figures, and herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the particular structures, methods or compositions contained herein. In particular, various embodiments of the present invention provide a number of different configurations of the overall gas to liquid conversion process.

The present invention relates to improved catalyst compositions, as well as methods of making and using them. In particular, preferred embodiments of the present invention comprise rare earth catalyst supports, catalyst compositions having rare earth supports, and methods of preparing and using the catalysts and supports. The present invention is more preferably directed towards syngas catalysts used in partial oxidation reactions and even more preferably used in syngas catalysts that contain Group VIII or noble metals. However, it should be appreciated that the catalyst compositions according to the present invention are useful for other partial oxidation reactions, which are intended to be within the scope of the present invention. In addition, the present invention contemplates an improved method for converting hydrocarbon gas to liquid hydrocarbons using the novel syngas catalyst supports and compositions described herein. Thus, the invention also relates to processes for converting hydrocarbon-containing gas to liquid hydrocarbons via an integrated syngas to Fischer-Tropsch process.

According to the present invention, a syngas reactor can comprise any of the synthesis gas technology and/or methods known in the art. The hydrocarbon-containing feed is almost exclusively obtained as natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock, while steam reforming requires only steam. According to the preferred embodiment of the present invention, partial oxidation is assumed for at least part of the syngas production reaction.

Regardless of the source, the hydrocarbon-containing feed and the oxygen-containing feed are reacted under catalytic conditions. Improved catalyst compositions in accordance with the present invention are described herein. They generally are comprised of a catalytic metal that has been reduced to its active form and one or more promoters on a support structure. The support structures may be monoliths, particulates, foam or any other shape or form that can be prepared from the compositions of the present invention. Often, the shape or form selected will dictate the type of catalyst bed that must be used. For example, fixed beds are comprised of monoliths, foam and/or large particle sized supports. Small support particles tend to be more useful in fluidized beds.

The synthesis gas feedstocks are generally preheated, mixed and passed over or through the catalyst beds. The gas hourly space velocity of the gas in the partial oxidation reactor can vary widely. It is preferred that the gas hourly space velocity of the gas be about 50,000 1/hr or greater. As the mixed feedstocks contact the catalyst, the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. The synthesis gas product, i.e., syngas, is then ready to be used, treated, or directed to its intended purpose. For example, in the instant case some or all of the syngas is preferably used as a feedstock for a Fischer-Tropsch process.

The syngas catalyst support compositions according to the present invention comprise rare earth metals. In particular, the supports comprise rare earth aluminates or rare earth gallates. For the sake of clarity and for purposes of illustration the discussion will focus on aluminates. However, it should be appreciated that gallates are equally contemplated as part of the present invention as well as all equivalent compositions.

It is well known that during syngas reactions, several undesired processes, such as coking (carbon deposition), metal migration, and sintering of metal and/or the support, can occur and severely deteriorate catalytic performance. Sintering, which results in a growth of particle sizes of metal and/or support, is a thermally induced deactivation mechanism commonly seen in high-temperature catalytic processes. Metal migration is then simply referred to the overall movement of metal components in a certain direction of the catalyst bed, and not necessarily related to sintering. In addition to these phenomena, solid state side reactions may take place between some of the catalytic metal components and the support compositions. For example, rare earth compounds such as samarium oxide can react with alumina to form samarium aluminate ($SmAlO_3$) at temperatures above 1000° C. as shown in equation (3):

$$Sm_2O_3 + Al_2O_3 \rightarrow 2SmAlO_3 \qquad (3)$$

It has been discovered that the formation, as opposed to the mere presence, of the rare earth aluminate or gallate, can expedite sintering of the catalytic metals. In addition, the formation mechanisms of the rare earth aluminate and/or gallate are also at least partially responsible for metal migration. As the aluminate or gallate is formed, the surface of the catalyst/support is actively changing and reforming, causing metal particles/clusters to migrate and move along the surface and subsurface. It was also discovered that catalyst compositions comprising rare earth aluminate and/or gallate suppressed carbon deposition better than other support materials.

Accordingly, the present invention includes support compositions comprising rare earth aluminate and/or gallate that are pre-formed prior to use in catalyzing the partial oxidation reaction. The support compositions are pre-formed so that the deactivating mechanisms associated with their formation are reduced or eliminated while the benefits of their presence are enhanced. The catalyst supports may be pure rare earth aluminate and/or gallate or may be partially rare earth aluminate and/or gallate in a traditional support matrix, such as alumina.

Support Preparation

Rare earth aluminates are commercially available or may be prepared as described below. It should be appreciated that the exact method for preparing the rare earth modified support matrix is not critical. An amount less than a stoichiometric amount, i.e., 1 mole $Sm_2O_3$ and 1 mole $Al_2O_3$ are stoichiometric amounts to form 2 moles of $SmAlO_3$, of rare earth oxide is mixed with $Al_2O_3$ or $Ga_2O_3$. The mixture is fired at a temperature between 1000° and 1500° C. to generate a rare earth aluminate or gallate powder. Extra $Al_2O_3$ or $Ga_2O_3$ can be added as a catalyst binder. Alternatively, rare earth nitrates can be coated either through incipient wetness or other coating techniques onto $Al_2O_3$ or $Ga_2O_3$, dried and then fired at a temperature above 1000° C., allowing the solid state reaction to take place and produce a mixture of rare earth aluminate/gallate and aluminum/gallium oxide. This can be repeated until the desired amount of rare earth is formed as part of the support material. The resulting support compositions are generally surface modified materials wherein the rare earth aluminate and/or gallate material is more prevalent at the surface than in the bulk of the support matrix material.

EXAMPLE 1

A rare earth (La) modified support material was prepared using a standard incipient wetness technique. 20 g of alpha alumina (30–50 mesh) was impregnated with an aqueous solution of $La(NO_3)_3$. The impregnated material was then dried in an oven at 100° C. overnight. The support material was further calcined at 1050° C. in air for 2 hours to allow the solid-state reaction between the alumina and lanthanum nitrate to take place. After calcination, the composition was found to be 6.40 wt % $LaAlO_3$ on $Al_2O_3$.

EXAMPLE 2

A rare earth (Sm) modified support material was prepared using a standard incipient wetness technique. 20 g of alpha alumina (30–50 mesh) impregnated with an aqueous solution of $Sm(NO_3)_3$. The impregnated material was then dried in an oven at 100° C. overnight. The support material was further calcined at 1050° C. in air for 2 hours to allow the solid-state reaction between the alumina and samarium nitrate to take place. After calcination, the composition was found to be 6.79 wt % $SmAlO_3$ on $Al_2O_3$.

EXAMPLE 3

Catalyst A was prepared from the rare earth modified support material in Example 1. The catalyst was prepared by incipient wetness impregnation of the $LaAlO_3/Al_2O_3$ particulate support material with a aqueous solution of rhodium chloride hydrate ($RhCl_3 \cdot xH_2O$). The nominal loading for Rh was 4% by weight. The rhodium impregnated modified support was dried at 100° C. overnight and then calcined at 600° C. in air for 3 hours. The calcined catalyst precursor was then reduced in a tube furnace under a flow of 300 ml/300 ml $H_2/N_2$ at 500° C. for 3 hours prior to catalytic testing.

EXAMPLE 4

Catalyst B was prepared from the rare earth modified support material in Example 2. The catalyst was prepared by incipient wetness impregnation of the $SmAlO_3/Al_2O_3$ particulate support material with a rhodium chloride hydrate ($RhCl_3 \cdot xH_2O$) solution. The nominal loading for Rh was 4% by weight. The rhodium impregnated modified support was dried at 100° C. overnight and then calcined at 600° C. in air for 3 hours. The catalyst was then reduced in a tube furnace under a flow of 300 ml/300 ml $H_2/N_2$ at 500° C. for 3 hours prior to catalytic testing.

Testing

The catalytic performance of the catalysts for a partial oxidation reaction was evaluated in a fixed-bed reactor operated at the atmospheric pressure. Two test runs were conducted in which an oxygen/methane volumetric ratio of 0.55 was introduced to a catalyst bed comprised of the catalyst A and B, respectively. In both runs, the inlet temperatures for the gases were kept at about 300° C. and the flow rates were kept at 3,500 cc/min. The results of the test runs as shown in Table 1.

TABLE 1

Reactivity Data of Rare Earth Modified Rhodium Catalysts

| Sample | Exit Temp (° C.) | ΔP (psi) | $CH_4$ Conversion (%) | $H_2$ Selectivity (%) | CO Selectivity (%) |
|---|---|---|---|---|---|
| Catalyst A | 708 | 2.7 | 93.6 | 92.9 | 95.9 |
| Catalyst B | 717 | 1.7 | 95.0 | 86.5 | 96.3 |

The data in Table 1 shows that the catalytic performance of the rare earth aluminate supported catalysts are comparable to other catalysts in the art. It is preferred that the catalysts exhibit hydrocarbon conversions of greater than 80%. The catalysts tested actually exhibited hydrocarbon conversions of greater than 90%. In addition, the exit temperatures for these rare earth modified catalysts is approximately 20–35 degrees lower than 4% Rh catalysts on alumina run under similar conditions. It is well known in the art that for synthesis gas production through methane partial oxidation, the rate of carbon deposition through methane decomposition is proportional to the reaction temperature. Thus, the rare earth aluminate supported Rh catalysts have an improved resistance to carbon deposition as well as a comparable performance capability. In addition, the pressure drop for catalysts A and B was less approximately half of the pressure drop for 4% Rh catalysts on alumina run under similar conditions, giving further confirmation that less carbon deposition was occurring.

Figure 2:
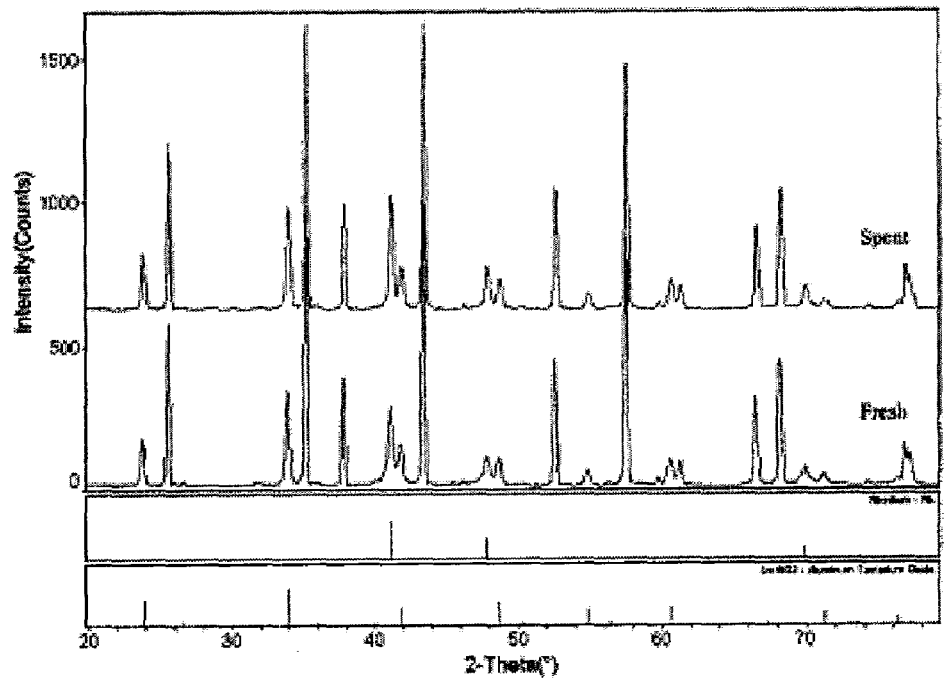
FIG. 2 is a comparison of XRD powder patterns of a La modified Rh catalyst before and after use in a partial oxidation reaction in accordance with a preferred embodiment of the present invention.

In addition, x-ray diffraction patterns of Catalyst A and B were taken before and after the partial oxidation testing described above. FIG. 1 shows the XRD pattern for Catalyst A before and after testing. FIG. 2 shows the XRD pattern for Catalyst B before and after testing. The Scherrer equation was used to calculate average crystal size of both Rh and rare earth aluminate. Both Catalysts A and B do not show any sign that sintering took place during the partial oxidation reaction. TEM observations of the catalysts show that the catalytic metal (rhodium) is dispersed on both the rare earth aluminate portions of the support and on unmodified alumina portions of the support.

The examples and testing data show that the catalyst compositions of the present invention are an improvement over prior art catalysts in their ability to reduce carbon deposition and inhibit sintering while maintaining high methane conversion and hydrogen and carbon monoxide selectivity values.

Accordingly, one of the preferred embodiments of the present invention is an improved method for converting a hydrocarbon containing gas and an oxygen containing gas to a gas mixture comprising hydrogen and carbon monoxide, i.e., syngas. The process comprises using the improved catalyst compositions described herein in a partial oxidation reaction such as the syngas reaction described above. Further, the process can include using the improved method for producing liquid hydrocarbons by sending the syngas product to a hydrocarbon synthesis reactor such as a Fischer-Tropsch reactor.

Syngas is typically at a temperature of about 600–1500° C. when leaving a syngas reactor. The syngas must be transitioned to be useable in a Fischer-Tropsch or other hydrocarbon synthesis reactors, which operate at lower temperatures of about 200° C. to 400° C. The syngas is typically cooled, dehydrated (i.e., taken below 100° C. to knock out water) and compressed during the transition phase. Thus, in the transition of syngas from the syngas reactor to a Fischer-Tropsch reactor, the syngas stream may experience a temperature window of 50° C. to 1500° C.

The Fischer-Tropsch reactor can comprise any of the Fischer-Tropsch technology and/or methods known in the art. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is then contacted with a Fischer-Tropsch catalyst. Fischer-Tropsch catalysts are well known in the art and generally comprise a catalytically active metal, a promoter and a support structure. The most common catalytic metals are Group VIII metals, such as cobalt, nickel, ruthenium, and iron or mixtures thereof. The support is generally alumina, titania, zirconia or mixtures thereof. Fischer-Tropsch reactors use fixed and fluid type conventional catalyst beds as well as slurry bubble columns. The literature is replete with particular embodiments of Fischer-Tropsch reactors and Fischer-Tropsch catalyst compositions. As the syngas feedstock contacts the catalyst, the hydrocarbon synthesis reaction takes place. The Fischer-Tropsch product contains a wide distribution of hydrocarbon products from $C_5$ to greater than $C_{100}$.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all issued patents, patent applications and publications cited herein are incorporated by reference.

What is claimed is:

1. A partial oxidation catalyst comprising:
   a support material comprising a rare earth aluminate, a rare earth gallate, or mixtures thereof, wherein the support material has been fired at a temperature at or above about 1000° C., and a catalytic metal useful for catalyzing a partial oxidation reaction, said catalytic metal being supported on said support material, wherein the rare earth aluminate or gallate comprises Sm.

2. A partial oxidation catalyst comprising:
a support material comprising a rare earth aluminate, a rare earth gallate, or mixtures thereof, wherein the support material has been fired at a temperature at or above about 1000° C., and
a catalytic metal useful for catalyzing a partial oxidation reaction, said catalytic metal being supported on said support material, wherein the support material comprises a rare earth gallate.

3. The partial oxidation catalyst according to claim 2 wherein the support material further comprises a rare-earth gallate and gallium oxide.

4. The partial oxidation catalyst according to claim 2 wherein the support material further comprises a rare-earth gallate and alumina.

5. A process for producing synthesis gas comprising:
passing a hydrocarbon containing gas and an oxygen containing gas comprising diatomic oxygen over a partial oxidation catalyst, under conditions effective to produce a gas stream comprising hydrogen and carbon monoxide,
wherein the partial oxidation catalyst comprises a catalytic metal supported on a support material, and
wherein the support material comprises a rare earth aluminate, a rare earth gallate, or mixtures thereof.

6. The process according to claim 5 wherein the rare earth aluminate or gallate comprises a rare earth element selected from the group Sm, La, Pr, Nd, Gd, Ce, Yb and mixtures thereof.

7. The process according to claim 5 wherein the rare earth aluminate or gallate comprises Sm.

8. The process according to claim 5 wherein the support material comprises a rare earth aluminate.

9. The process according to claim 5 wherein the support material comprises a rare earth gallate.

10. The process according to claim 5 wherein the support material further comprises one or more of the compounds selected from the group consisting of $A_2O_3$, $Ga_2O_3$, $SmAlO_3$, $LaAlO_3$, $PrAlO_3$, $YbAlO_3$, $NdAlO_3$, $GdAlO_3$, $CeO_2/Al_2O_3$, and mixtures thereof.

11. The process according to claim 5 wherein the catalytic metal comprises a Group VIII or noble metal.

12. The process according to claim 5 wherein the catalytic metal comprises rhodium.

13. A hydrocarbon gas to liquid conversion process comprising:
(a) passing a hydrocarbon containing gas and an oxygen containing gas over a partial oxidation catalyst, under conditions effective to produce a gas stream comprising hydrogen and carbon monoxide,
wherein the partial oxidation catalyst comprises a catalytic metal supported on a support material,
wherein the support material comprises a rare earth aluminate, a rare earth gallate, or mixtures thereof, and
(b) reacting at least a portion of the gas stream from step (a) in a hydrocarbon synthesis reactor under conditions effective to produce liquid hydrocarbons.

14. The process according to claim 13 wherein the rare earth aluminate or gallate comprises a rare earth element selected from the group consisting of Sm, La, Pr, Nd, Gd, Ce, Yb and mixtures thereof.

15. The process according to claim 13 wherein the rare earth aluminate or gallate comprises Sm.

16. The process according to claim 13 wherein the support material comprises a rare earth aluminate.

17. The process according to claim 13 wherein the support material comprises a rare earth gallate.

18. The process according to claim 13 wherein the support material further comprises one or more of the compounds selected from the group consisting of $Al_2O_3$, $Ga_2O_3$, $SmAlO_3$, $LaAlO_3$, $PrAlO_3$, $YbAlO_3$, $NdAlO_3$, $GdAlO_3$, $CeO_2/Al_2$, $O_3$, and mixtures thereof.

19. The process according to claim 13 wherein the catalytic metal comprises a Group VIII or noble metal.

20. The process according to 13 wherein the catalytic metal comprises rhodium.

21. The process according to claim 13 wherein the hydrocarbon synthesis reactor is a Fischer-Tropsch reactor.

22. The process of claim 13 wherein the gas hourly space velocity in the partial oxidation reactor is greater than 50,000 1/hr.

23. The process of claim 22 wherein the hydrocarbon conversion in the partial oxidation reactor is greater than 80%.

24. A process for a partial oxidation reaction, comprising contacting a feed stream comprising hydrogen and carbon monoxide with a catalyst in a reaction zone; said catalyst comprising at least one catalytic metal for partial oxidation reactions and a support comprising a rare earth aluminate.

25. The process according to claim 24 wherein the rare earth aluminate comprises at least one element selected from the group consisting of elements with atomic numbers 58 through 71.

26. The process according to claim 24 wherein the rare earth aluminate comprises at least one rare earth element selected from the group consisting of Sm, La, Pr, Nd, Gd, Ce, Yb and any mixtures thereof.

27. A process for a partial oxidation reaction, comprising contacting a feed stream comprising hydrogen and carbon monoxide with a catalyst in a reaction zone; said catalyst comprising at least one catalytic metal for partial oxidation reactions and a support comprising a rate earth gallate.

28. The process according to claim 27 wherein the rare earth gallate comprises at least one element selected from the group consisting of elements with atomic numbers 58 through 71.

29. The process according to claim 27 wherein the rare earth gallate comprises at least one rare earth element selected from the group consisting of Sm, La, Pr, Nd, Gd, Ce, Yb and any mixtures thereof.

* * * * *

UNITED STATES PATENT AND TRADEMARK OFFICE
CERTIFICATE OF CORRECTION

PATENT NO. : 7,001,867 B2
DATED : February 21, 2006
INVENTOR(S) : Yaming Jin, Tianyan Niu and Harold A. Wright It is certified that error appears in the above-identified patent and that said Letters Patent is hereby corrected as shown below:

<u>Column 10,</u>
Line 18, "$CeO_2/Al_2, O_3$" should read -- $CeO_2/Al_2O_3$ --.

Signed and Sealed this

Eighteenth Day of April, 2006

JON W. DUDAS
*Director of the United States Patent and Trademark Office*